(12) United States Patent
Jeansonne et al.

(10) Patent No.: US 10,733,288 B2
(45) Date of Patent: *Aug. 4, 2020

(54) VERIFYING CONTROLLER CODE AND SYSTEM BOOT CODE

(71) Applicant: HEWLETT-PACKARD DEVELOPMENT COMPANY, L.P., Houston, TX (US)

(72) Inventors: Jeffrey Kevin Jeansonne, Houston, TX (US); Valiuddin Y Ali, Houston, TX (US); James M Mann, Houston, TX (US); Boris Balacheff, Les Ulis (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 804 days.

This patent is subject to a terminal disclaimer.

(21) Appl. No.: 14/780,892

(22) PCT Filed: Apr. 23, 2013

(86) PCT No.: PCT/US2013/037735
§ 371 (c)(1),
(2) Date: Sep. 28, 2015

(87) PCT Pub. No.: WO2014/175867
PCT Pub. Date: Oct. 30, 2014

(65) Prior Publication Data
US 2016/0055332 A1    Feb. 25, 2016

(51) Int. Cl.
*G06F 21/55*    (2013.01)
*G06F 21/57*    (2013.01)
*G06F 9/4401*    (2018.01)

(52) U.S. Cl.
CPC .......... *G06F 21/552* (2013.01); *G06F 9/4406* (2013.01); *G06F 21/575* (2013.01); *G06F 2221/034* (2013.01)

(58) Field of Classification Search
None
See application file for complete search history.

(56) References Cited

U.S. PATENT DOCUMENTS

| | | |
|---|---|---|
| 5,918,047 A | 6/1999 | Leavitt |
| 6,205,527 B1 | 3/2001 | Goshey |
| 6,711,675 B1 | 3/2004 | Spiegel et al. |
| 7,734,945 B1 | 6/2010 | Levidow |

(Continued)

FOREIGN PATENT DOCUMENTS

| | | |
|---|---|---|
| CN | 1612115 A | 5/2005 |
| CN | 102971742 A | 3/2013 |

(Continued)

OTHER PUBLICATIONS

International Search Report and Written Opinion received in PCT Application No. PCT/US2013/037735, dated Jan. 24, 2014, 10 pgs.

(Continued)

*Primary Examiner* — Farid Homayounmehr
*Assistant Examiner* — Olanrewaju J. Bucknor
(74) *Attorney, Agent, or Firm* — Trop, Pruner & Hu P.C.

(57) ABSTRACT

A controller that is separate from a processor of the system verifies controller code for execution on the controller. In response to verifying the controller code, the controller verifies a system boot code.

19 Claims, 6 Drawing Sheets

(56) References Cited

U.S. PATENT DOCUMENTS

| | | |
|---|---|---|
| 7,900,091 B2 | 3/2011 | Chou et al. |
| 8,086,841 B2 | 12/2011 | Guo |
| 8,489,922 B2 | 7/2013 | Matthew |
| 8,732,527 B2 | 5/2014 | Tabone |
| 9,417,967 B2 | 8/2016 | Huang |
| 2003/0126511 A1 | 7/2003 | Yang |
| 2003/0221114 A1* | 11/2003 | Hino ............... G06F 21/31 713/189 |
| 2004/0025002 A1 | 2/2004 | Cepulis |
| 2004/0025036 A1* | 2/2004 | Balard ............... H04L 9/0822 713/189 |
| 2004/0030877 A1* | 2/2004 | Frid ............... G06F 8/665 713/1 |
| 2004/0133790 A1 | 7/2004 | Hensley |
| 2004/0193862 A1 | 9/2004 | Lin |
| 2005/0108564 A1* | 5/2005 | Freeman ............... G06F 21/575 726/26 |
| 2005/0190699 A1* | 9/2005 | Smith ............... H04L 41/0856 370/241 |
| 2006/0161784 A1* | 7/2006 | Hunter ............... G06F 21/575 713/182 |
| 2006/0179302 A1* | 8/2006 | Hatakeyama ............... G06F 21/51 713/164 |
| 2006/0225067 A1 | 10/2006 | Yang |
| 2007/0088943 A1 | 4/2007 | Phelps et al. |
| 2007/0226478 A1* | 9/2007 | Rudelic ............... G06F 21/575 713/1 |
| 2007/0260866 A1* | 11/2007 | Wang ............... G06F 21/57 713/2 |
| 2008/0098381 A1 | 4/2008 | Lin |
| 2008/0126779 A1* | 5/2008 | Smith ............... G06F 21/575 713/2 |
| 2008/0126782 A1* | 5/2008 | Dayan ............... G06F 21/575 713/2 |
| 2008/0172558 A1 | 7/2008 | Stakutis |
| 2008/0195750 A1 | 8/2008 | Sadovsky |
| 2008/0209553 A1 | 8/2008 | Lu |
| 2008/0269954 A1* | 10/2008 | Lev ............... G05D 23/19 700/299 |
| 2009/0100287 A1 | 4/2009 | Chu |
| 2009/0240934 A1 | 9/2009 | Chou |
| 2009/0327684 A1* | 12/2009 | Zimmer ............... G06F 21/575 713/2 |
| 2010/0017589 A1 | 1/2010 | Reed |
| 2010/0064127 A1 | 3/2010 | Lee |
| 2010/0070743 A1* | 3/2010 | Grigor ............... G06F 21/575 713/1 |
| 2010/0082960 A1* | 4/2010 | Grobman ............... G06F 21/575 713/2 |
| 2010/0235617 A1 | 9/2010 | Chen |
| 2011/0029742 A1 | 2/2011 | Grube et al. |
| 2011/0066837 A1 | 3/2011 | Lee |
| 2011/0093741 A1 | 4/2011 | Liang |
| 2012/0072710 A1 | 3/2012 | Gupta |
| 2012/0072897 A1 | 3/2012 | Selvam |
| 2013/0013905 A1 | 1/2013 | Held et al. |
| 2013/0159690 A1* | 6/2013 | Tsukamoto ............... G06F 1/26 713/2 |
| 2013/0232325 A1 | 9/2013 | Jang |
| 2014/0115314 A1* | 4/2014 | Huang ............... G06F 21/575 713/2 |
| 2015/0095632 A1 | 4/2015 | Huang |
| 2015/0242656 A1* | 8/2015 | Dasari ............... G06F 21/57 713/189 |
| 2015/0301880 A1 | 10/2015 | Allu |
| 2015/0324588 A1 | 11/2015 | Locke |
| 2016/0055113 A1 | 2/2016 | Hodge |
| 2016/0364570 A1 | 12/2016 | Stern |

FOREIGN PATENT DOCUMENTS

| | | |
|---|---|---|
| TW | 2008/09489 A | 2/2008 |
| TW | 200931312 A | 7/2009 |
| WO | WO-2012148422 A1 | 11/2012 |

OTHER PUBLICATIONS

U.S. Appl. No. 14/780,929, Notice of Allowance dated Aug. 24, 2017, pp. 1-2 and attachments.

U.S. Appl. No. 14/780,929, Notice of Allowance dated Jul. 28, 2017, pp. 1-7 and attachments.

U.S. Appl. No. 14/780,967, Non-Final Office Action dated Jun. 28, 2017, pp. 1-12 and attachments.

Hodge et al., International Application No. PCT/US13/37725 entitled Redundant System Boot Code in a Secondary Non-Volatile Memory filed Apr. 23, 2013 (25 Pages).

Jeansonne et al., International Application No. PCT/US13/37724 entitled Recovering From Compromised System Boot Code filed Apr. 23, 2013 (29 pages).

Jeansonne et al., International Application No. PCT/US13/37727 entitled Configuring a System filed Apr. 23, 2013 (35 pages).

Jeansonne et al., International Application No. PCT/US13/37728 entitled Event Data Structure to Store Event Data filed Apr. 23, 2013 (36 pages).

Jeansonne et al., International Application No. PCT/US13/37729 entitled Repairing Compromised System Data in a Non-Volatile Memory filed Apr. 23, 2013 (25 pages).

Jeansonne et al., International Application No. PCT/US13/37733 entitled Retrieving System Boot Code From a Non-Volatile Memory filed Apr. 23. 2013 (26 pages).

\* cited by examiner

VERIFYING CONTROLLER CODE AND SYSTEM BOOT CODE

BACKGROUND

A computing system can include code to perform various startup functions of the computing system. This code can include Basic Input/Output System (BIOS) code. BIOS code can be the subject of attacks by malware in the computing system or from an external service. As a result of an attack, the BIOS code can become compromised.

BRIEF DESCRIPTION OF THE DRAWINGS

Some implementations are described with respect to the following figures.

DETAILED DESCRIPTION

Ma ware attacks on system code used to perform startup of a computing system can cause the integrity of the computing system to be compromised such that unauthorized access and operations in the computing system can occur. For example, compromised system code can allow covert remote monitoring and/or control of the computing system by a malicious entity, unauthorized access and/or modification of data in the computing system by malware, disablement of the computing system, and so forth. Compromised system code can refer to system code that has been corrupted such that the system code is no longer usable, or alternatively, compromised system code can refer to system code that has been changed in some way but that is still able to execute. Note that system code can also be compromised accidentally or unintentionally.

Although a protection mechanism can be provided in a computing system to protect the system code, such protection mechanism may become compromised under certain conditions, which can subject the system code to malware attacks.

System code used to perform startup of a computing system can include system firmware, which can be in the form of machine-readable instructions executable on a processor (or processors) of the computing system. "System firmware" can refer to any machine-readable instructions that are able to perform startup of a computing system. Examples of computing systems include desktop computers, notebook computers, tablet computers, personal digital assistants (PDAs), smartphones, game appliances, server computers, storage nodes, network communication nodes, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include legacy BIOS code or Unified Extensible Firmware Interface (UEFI) code. In some examples, the BIOS code can include a runtime portion that is executed after the OS loads.

The system firmware can be stored in non-volatile memory, such as a flash memory or any other persistent memory that is programmable. Once system firmware in a non-volatile memory is compromised, one possible remediation may involve physically replacing a component that includes the non-volatile memory. Such a technique of addressing compromised system firmware can be labor-intensive, costly, and time-consuming.

Figure 1:
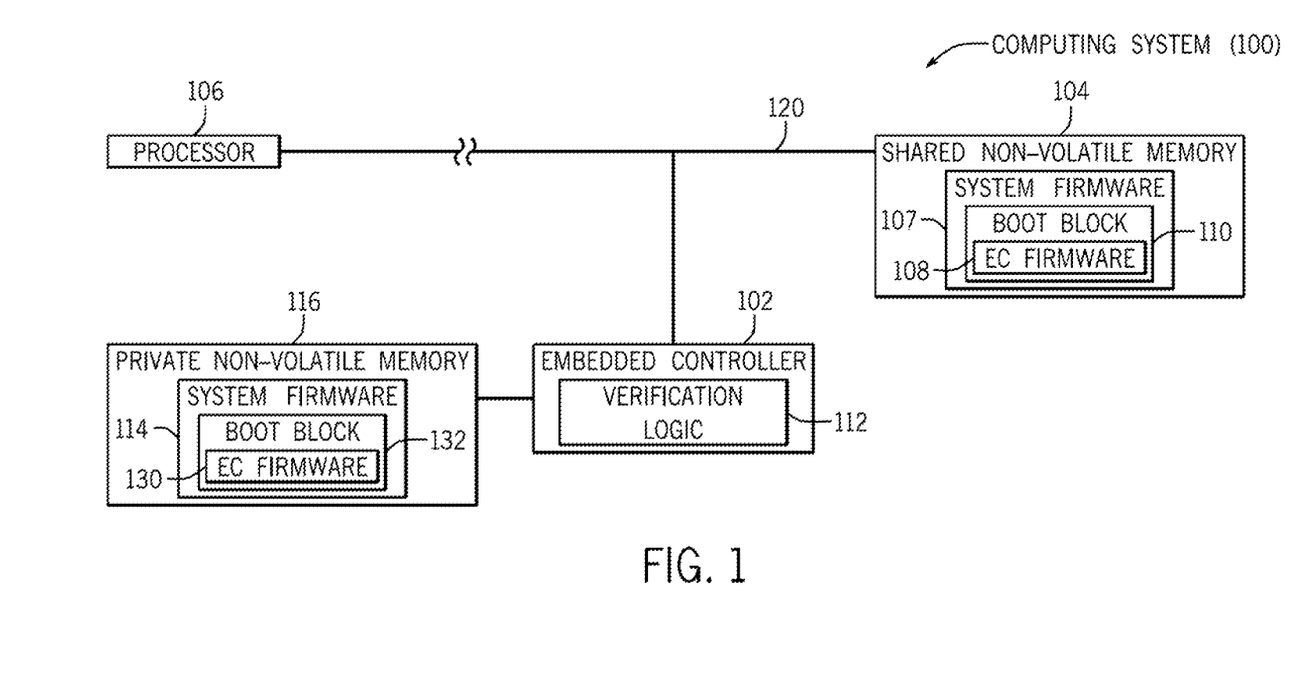
FIG. 1 is a block diagram of an example system according to implementations.

In accordance with some implementations, techniques or mechanisms are provided to allow for detection of compromised system firmware as well as self-healing of the system firmware in case compromise of system firmware is detected.—FIG. 1 is a block diagram of an example computing system 100 that includes an embedded controller 102, a shared non-volatile memory 104, a processor 106, and a private non-volatile memory 116. The shared non-volatile memory 104 is "shared" in the sense that it is accessible by multiple entities, including the embedded controller 102 and at least one other entity (including the processor 106). The private non-volatile memory 116 is accessible by the embedded controller 102, but is inaccessible to the processor 106 or to other components in the computing system 100. Making the private non-volatile memory 116 inaccessible to the processor 106 and other components protects the content of the private non-volatile memory 116 from unauthorized tampering. The private non-volatile memory 116 is accessible by the embedded controller 102 at all times.

Although not shown in FIG. 1, an input/output (I/O) controller may be provided between the processor 106 and the shared non-volatile memory 104.

The private non-volatile memory 116 can be physically separate from the shared non-volatile memory 104 (such as implemented in different physical memory devices). Alternatively, the private non-volatile memory 116 and the shared non-volatile memory 104 can physically reside on a common memory device, but the shared non-volatile memory 104 and the private non-volatile memory 116 are in different segments of the physical memory device, where the segment of the physical memory device that contains the private non-volatile memory 116 is accessible by only the embedded controller 102.

The shared non-volatile memory 104 is accessible over a shared bus 120 by the embedded controller 102 or by another entity. In some implementations, just one entity can have access to the shared bus 120 at any given time, such that just one entity can access the shared non-volatile memory 104 at a time. In some examples, the shared bus 120 is a shared Serial Peripheral Interface (SPI) bus. An SPI bus is a synchronous serial data link in which devices on the SPI bus operate in a master-slave mode. In other examples, another type of shared bus 120 can be used. In alternative examples, an arbitration mechanism can be provided to allow for shared access of the bus 120 in various states of the computing system, including a low power state and a normal runtime state.

The shared non-volatile memory 104 can store system firmware 107, which can include BIOS code. The BIOS code 107 can include controller code 108 that is for execution by the embedded controller 102, and a boot block 110 that is to be executed by the processor 106. The controller code 108 can be in the form of embedded controller (EC) firmware, which can refer to any machine-readable instructions executable in the embedded controller 102. Alternatively, the controller code 108 can be application software that can be in the form of machine-readable instructions. In the ensuing discussion, although reference is made to "EC firmware," it is noted that techniques or mechanisms can be applied to other forms of the controller code 108.

In examples according to FIG. 1, the EC firmware 108 is included in the boot block 110 of the system firmware 107. Including the EC firmware 108 inside the boot block 110 can provide an indication that the EC firmware 108 has been signed by the entity that provided the system firmware 107, which can be the vendor of the computing system 100, or another entity. In other examples, the EC firmware 108 can be separate from the boot block 110.

The boot block 110 is a part of the BIOS code, and is first executed when the computing system 100 starts up. The boot block 110 is executed first before the rest of the BIOS code is allowed to execute. The boot block 110 can be used to check the integrity of the BIOS code as well as to perform other initial functions. If the boot block 110 confirms the integrity of the BIOS code, then the boot block 110 can pass control to the main portion of the BIOS code for initiating the remaining operations associated with the BIOS code.

In some implementations, the boot block 110 can include core root of trust for measurement (CRTM) logic, which is logic specified by the Trusted Computing Group (TCG), an industry standard work group. During a power on procedure of the computing system 100, the CRTM logic can perform certain initialization tasks and can make a number of measurements that are stored for later use. The CRTM logic can then check the BIOS code before passing control to the main portion of the BIOS code. Once the BIOS code completes execution and passes control to the OS, the OS can verify the trustworthiness of the computing system 100 based on measurements taken by the CRTM logic.

The embedded controller 102 is physically separate from the processor 106 of the computing system 100. The processor 106 is used for executing the OS, application code, and other code in the system 100. The embedded controller 102, on the other hand, can be used to perform specific predefined tasks, as programmed into the EC firmware 108. Examples of tasks that can be performed by the embedded controller 102 include any one or some combination of the following: power supply control in the computing system 100 (for controlling a power supply that supplies power supply voltages to various components in the computing system 100), charging and control of a battery in the computing system 100, thermal monitoring to monitor a temperature in the computing system 100), fan control (to control a fan in the computing system 100), and interaction with a user input device (such as performing a scan of a keyboard of the computing system 100 or interaction with a pointing device such as a mouse, touchpad, touchscreen, and so forth). The embedded controller 102 can be implemented with a microcontroller, an application specific integrated circuit (ASIC), a programmable gate array (PGA), or any other type of programmable circuit.

The computing system 100 also includes the private non-volatile memory 116, which stores a system firmware copy 114, where the system firmware copy 114 includes a boot block 132 and an EC firmware 130. The system firmware copy 114 in the private non-volatile memory 116 can be a duplicate of the system firmware 107 in the shared non-volatile memory 104. Alternatively, the system firmware copy 114 may be a different version (later version or ear version) than the system firmware 107.

In some implementations, the embedded controller 102 can first attempt to use the EC firmware 130 in the private non-volatile memory 116 during a restart of the computing system 100. If the embedded controller 102 is unable to successfully use the EC firmware 130, then the embedded controller 102 can use the EC firmware 108 in the shared non-volatile memory 104 in an attempt to start the computing system 100. If the embedded controller 102 is unable to start the system using either of the EC firmware 130 or the EC firmware 108, then an error has occurred, which is likely due to compromise of both the EC firmware 130 and the EC firmware 108.

Although reference is made to first attempting to use the EC firmware 130 in the private non-volatile memory 116 before attempting to use the EC firmware 108 in the shared non-volatile memory 104, different implementations can first attempt to use the EC firmware 108 in the shared non-volatile memory 104 before attempting to use the EC firmware 130 in the private non-volatile memory 116. In other examples, EC firmware (or a portion thereof) can be embedded in the embedded controller 102. The EC firmware embedded in the embedded controller 102 may be immutable.

In accordance with some implementations, the embedded controller 102 includes verification logic 112 that is able to verify the EC firmware (130 and/or 108) retrieved from a non-volatile memory (116 and/or 104) during an initialization procedure of the embedded controller. Verifying a piece of code, such as the EC firmware, can refer to cryptographically validating that the piece of code has not been changed and/or confirming that the piece of code is from a trusted source. An initialization procedure (or more simply, an "initialization") refers to a procedure that is performed when the embedded controller 102 first starts after the embedded controller 102 has been reset or after a power cycle of the embedded controller 102 (where power is removed from and then re-applied to the embedded controller 102).

In addition, once the EC firmware is verified and loaded for execution on the embedded controller 102, the EC firmware can verify system firmware prior to each restarted execution of the system firmware by the processor 106, such as due to a cold reset of the computing system 100, a resume from a low power state of the computing system 100, an operating system restart, and so forth. It is noted that the system firmware can also be verified by the EC firmware each time the computing system 100 enters a low power state. In other examples, the EC firmware can also verify the system firmware when the processor 106 remains powered.

A low power state of the computing system 100 refers to a state of the computing system 100 in which the processor 106 and certain other hardware components of the system 100 are off (e.g. no power is provided to the processor and the certain other hardware components). In the low power state, power can still be provided to the embedded controller 102. The computing system 100 can transition to a low power state in any of the following scenarios: (1) as part of a cold reset of the computing system 100 that caused the system 100 to be powered off for subsequent power on, or (2) as part of a power savings procedure, in which the computing system 100 can transition from a normal operating state to a sleep state, hibernation state, or an off state after a time period of inactivity, or in response to detecting a low battery condition, or in response to user or application command, or for another reason, or (3) in any other scenario.

Examples of low power states can include certain Advanced Configuration and Power Interface (ACPI) states, including: the ACPI S3 state (which is a form of a standby or sleep state in which the system context of the computing system 100 is maintained in volatile memory that remains powered while some components of the computing system 100 are powered off); the ACPI S4 state (which is a form of hibernation state in which the system context is saved to persistent storage to allow power to be removed from additional computing system components, including volatile memory); and the ACPI S5 state (which is a form of system off state, in which power has been removed from even more components of the computing system 100).

In further examples, the EC firmware can perform verification of the system firmware in response to a warm reset of the computing system 100, in which a computing system 100 is restarted without removing power to the computing system 100. As discussed further below, to allow the EC firmware to perform the verification in response to the warm reset, the computing system 100 can be forced to transition to an appropriate low power state (such as certain ones of the low power states listed above) when the warm reset is detected.

In other implementations, the EC firmware can perform the verification at any time, even when the computing system is not in a low power state. For example, the EC firmware can perform the verification when the processor is idle or not accessing the shared non-volatile memory 104. The verification by the EC firmware can also be performed in "real-time," as the system firmware is retrieved for execution by the processor.

Figure 2:
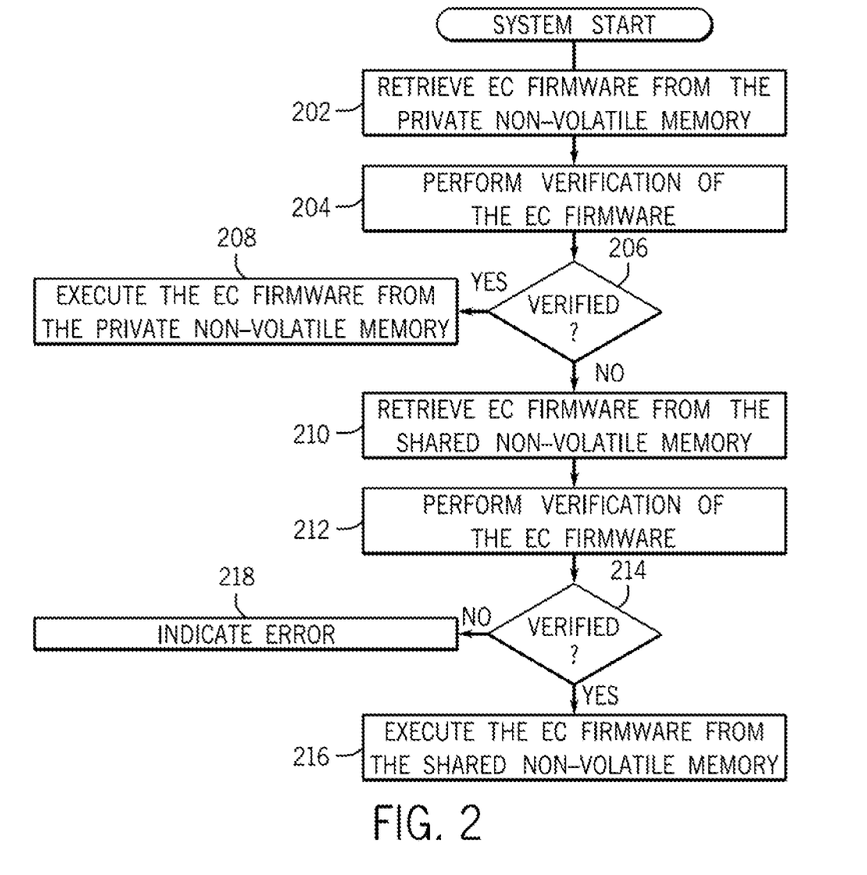
FIG. 2 is a flow diagram of a startup process performed by an embedded controller, according to some implementations.

As depicted in FIG. 2, as part of system start, the embedded controller 102 is allowed to perform its operations. The process depicted in FIG. 2 can be considered Phase 1 of the startup procedure of the computing system 100. Generally, Phase 1 involves retrieving EC firmware into the embedded controller 102, verifying the EC firmware, and executing the EC firmware upon verification. The operations of the embedded controller 102 can be performed while the computing system 100 is in a low power state.

The embedded controller 102 first retrieves (at 202) the EC firmware 130 of the private non-volatile memory 116. The verification logic 112 then performs (at 204) verification of the EC firmware 130. The verification of the EC firmware can be based on use of a cryptographic-based verification technique. For example, the verification can be a Rivest, Shamar, and Adleman (RSA) verification technique that employs cryptographic encryption. The RSA verification technique involves use of a public key and a private key. The public key is known to multiple entities, but the private key is only known to a single entity. Data encrypted with a private key can be decrypted using the corresponding public key. Alternatively, data can be encrypted using the private key, but decrypted using the public key.

If the verification logic 112 determines (at 206) that the EC firmware 130 from the private non-volatile memory 116 has been successfully verified, then the EC firmware 130 is executed (at 208) by the embedded controller 102 to perform embedded controller initialization tasks.

However, if the verification logic 112 determines (at 206) that the EC firmware 130 has not been successfully verified (such as due to compromise of the EC firmware 130 or for another reason), then the embedded controller 102 retrieves (at 210) the EC firmware 108 from the shared non-volatile memory 104. The verification logic 112 then performs (at 212) the verification (using an RSA verification technique or other verification technique) of the EC firmware 108. If the EC firmware 108 is successfully verified (at determined at 214), then the EC firmware 108 is executed (at 216) by the embedded controller 102. However, if the EC firmware 108 is not verified by the verification logic 112, then an error is indicated (at 218).

After Phase 1 completes successfully (Phase 1 has proceeded to task 208 or 216), the next phase (Phase 2) can proceed. Phase 2 (described in further detail in connection with FIG. 5) generally involves the EC firmware (130 or 108) performing verification of the boot block 132 in the private non-volatile memory 116 and the boot block 110 in the shared non-volatile memory 104. Phase 2 can be performed while the computing system 100 is in a low power state. If both the boot blocks 132 and 110 are verified by the EC firmware, then Phase 2 can complete successfully, and the system is ready to boot using the boot block (132 or 110). On the other hand, if the EC firmware determines that either the boot block 132 in the private non-volatile memory 116 or the boot block 110 in the shared non-volatile memory 104 is compromised, then the EC firmware uses specified one or multiple policies to resolve the compromise of either the boot block 132 or boot block 110. If both the boot block 132 and the boot block 110 are compromised, then a system error has occurred, and the computing system 100 is not allowed to boot.

Figure 3:
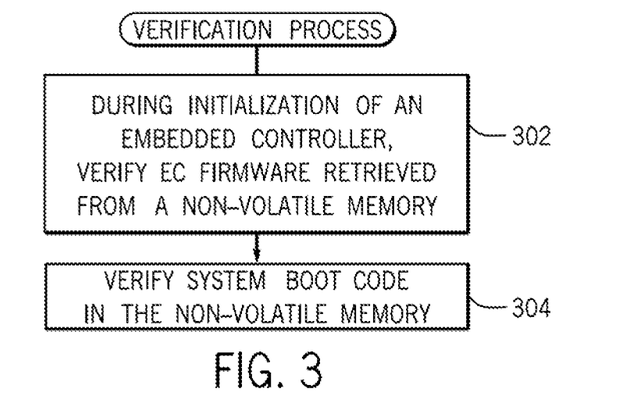
FIG. 3 is a flow diagram of a verification process according to some implementations.

FIG. 3 is a flow diagram of a verification process according to some implementations. The verification process can be performed by the embedded controller 102. During initialization of the embedded controller 102, the verification process verifies (at 302) the EC firmware retrieved from a non-volatile memory (e.g. 116 or 104 in FIG. 1), such as by using an RSA verification technique or other verification technique. The verifying (at 302) is performed prior to execution of any code by the processor 106.

After verification of the EC firmware, the EC firmware can be loaded into the embedded controller 102 for execution. In response to verifying the EC firmware, the verification process can further verify (at 304) system boot code in the non-volatile memory (e.g. 116 or 104). The system boot code that is verified can include the boot block 132 and/or boot block 110. More generally, the system boot code can refer to any system code that is used to boot the computing system 100 or to resume the computing system 100 from a low power state. The verifying (at 304) can be performed by the EC firmware executed in the embedded controller 102.

If the system boot code (e.g. boot block 132 and/or boot block 110) is verified, then the computing system 100 is ready to boot. If one of the boot blocks 132 and 110 cannot be verified, then the EC firmware can use one of the boot blocks 132 and 110 to fix the other of the boot blocks 132 and 110. The boot block 110 can then be retrieved from the shared non-volatile memory 104 and loaded to the processor 106 for execution.

The verification process according to some implementations can thus verify that the boot block 110 is not compromised (and if compromised, the boot block 110 can be fixed) before the boot block 110 is executed by the processor 106. In this manner, protection can be provided against the possibility of compromise of content of the system firmware by malware. Also, protection can be provided against a part-replacement attack that involves replacing the shared non-volatile memory component 104 (or 116) with another component that contains a non-volatile memory containing compromised system firmware.

The verification of the system boot code can be performed on each transition of the computing system 100 to a low power state. This ensures that the system boot code has not been compromised before the system boot code is executed by the processor 106 during transition out of the lower power state to a higher power state. More generally, the verification of the system boot code can be performed prior to each instance of the processor 106 restarting execution of the system boot code.

Figure 4:
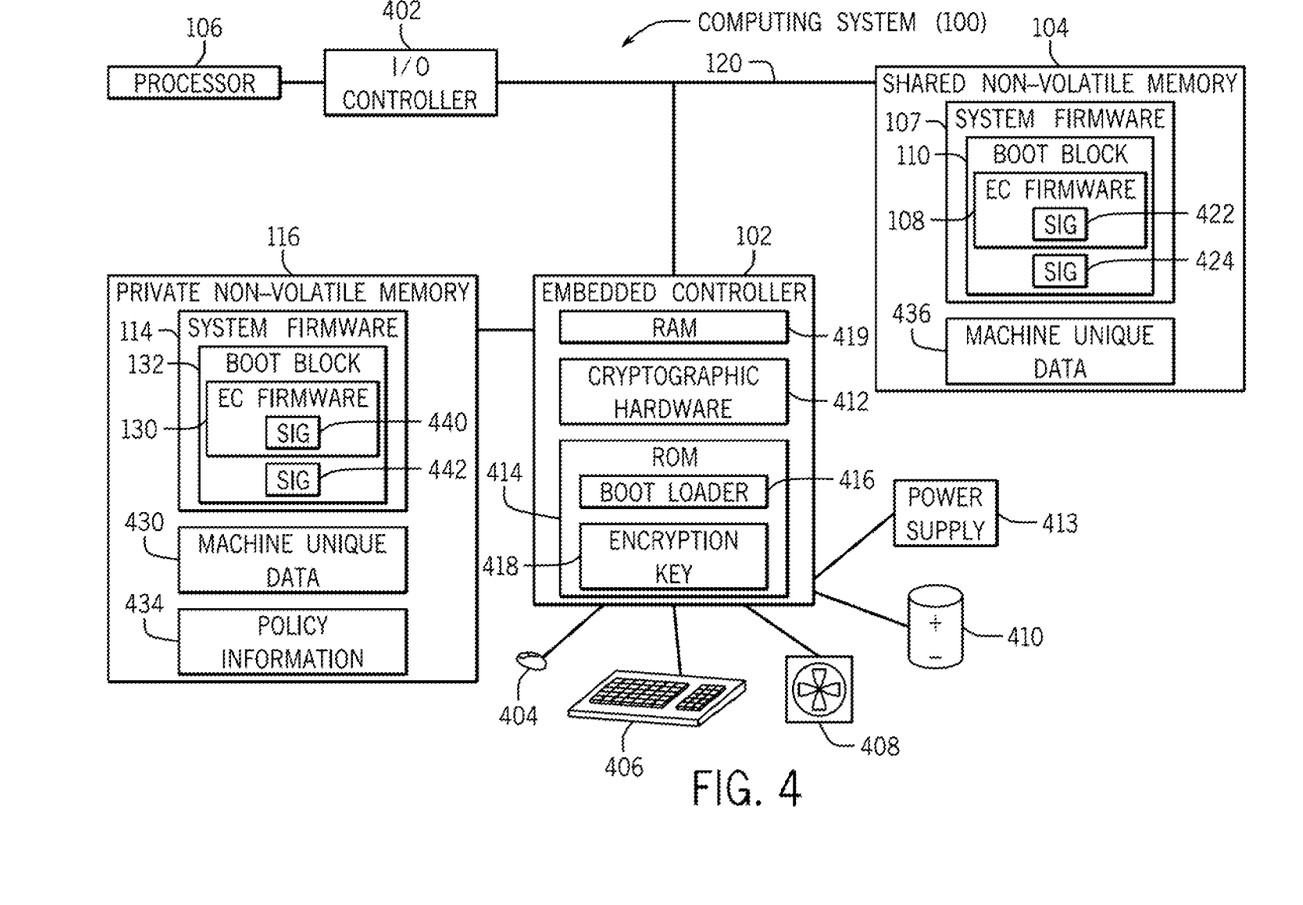
FIG. 4 is a block diagram of an example system according to further implementations.

FIG. 4 is a block diagram of the computing system 100 according to further implementations. The computing system 100 of FIG. 4 includes an input/output (I/O) controller 402, which is connected between the processor 106 and the shared bus 120. In some examples, the I/O controller 402 can be a Platform Controller Hub (PCH) from Intel Corporation. The PCH can include various functions, including a display interface to a graphics subsystem, a system bus interface to a system bus to which various I/O devices can be connected, and so forth. In other examples, other types of I/O controllers can be used.

As depicted in FIG. 4, the embedded controller 102 is coupled to a user input device 404 (e.g. a mouse device or other type of input device), a keyboard 406, a fan 408, a battery 410, and a power supply 413, to manage the respective devices (under control of the EC firmware for example).

In the FIG. 4 example, the embedded controller 102 also includes cryptographic hardware 412, which can perform cryptographic computations, such as those used in the verifying of the EC firmware and the boot block. The cryptographic hardware 412 can be in the form of circuitry that is configured to perform cryptographic computations.

The embedded controller 102 further includes a read-only memory (ROM) 414, which can be used to store a boot loader 416 and an encryption key 418. The encryption key 418 can be the key (public key or private key) used to perform verification of the EC firmware (130 or 108). During system startup, the boot loader 416 is loaded from the ROM 414 to execute in the embedded controller 102 to retrieve EC firmware from the private or shared non-volatile memory 116 or 104 into a random access memory (RAM) 419 of the embedded controller 102. The boot loader 416 can take steps to ensure that no other entity except the embedded controller 102 has access to the shared bus 120 during the EC firmware load operation.

To retrieve an EC firmware for loading into the embedded controller 102, the boot loader 416 can find a pointer (or other reference) to an EC firmware image, which can be stored in the private or shared non-volatile memory 116 or 104.

The retrieved EC firmware is verified by the verification logic 112 of Fi which can include functionality in the boot loader 416 that is able to invoke the cryptographic hardware 412 to assist in performing cryptographic computations.

In the shared non-volatile memory 104, a signature 422 is associated with the EC firmware 108, and a signature 424 is associated with the boot block 110. Similarly, in the private non-volatile memory 116, a signature 440 is associated with the EC firmware 130, and a signature 442 is associated with the boot block 132. The signature 440 or 422 is used in the verification of the respective EC firmware 108 or 130, while the signature 442 or 424 is used in the verification of the respective boot block 110 or 132. Use of a signature in the verification process can allow a determination of the authenticity of the respective EC firmware or boot block, and a determination that the respective EC firmware or boot block has not been compromised.

In some implementations, the verification of the EC firmware 108 or 130 can be accomplished by decrypting the respective signature 422 or 440 using the encryption key 418 stored in the embedded controller ROM 414. Decrypting the signature produces a respective value (e.g. hash value) that can be compared with a corresponding calculated value (e.g. hash value) of the EC firmware. If the foregoing values match, then the EC firmware is verified. A similar process can be used for verifying the BIOS boot block 110 or 132 using the respective digital signature 424 or 442. In alternative examples, any cryptographic technique can be used to perform the verification.

The private non-volatile memory 116 can also store machine unique data 430 and policy information 434. For example, the policy information 434 can include information relating to one or some combination of the following policies:

a policy specifying whether an aggressive mode of operation is to be used, where aggressive mode enables verification of system firmware in every case where the host processor will execute the boot block (on each cold boot, warm boot, resume from low power state, etc.)

a policy specifying whether a manual or automated recovery mode is to be used, where a manual recovery mode involves a user action before recovery of a compromised boot block is allowed to be performed; and a policy specifying whether a locked or unlocked mode is to be used, where locked mode causes system firmware to be locked to a specific version, such as the version in the private non-volatile memory 116.

The machine unique data 430 can refer to any data or settings that are unique to each particular computing system. Examples of machine unique data can include any or some combination of the following: product name, product model, stock-keeping unit (SKU) number (for identifying the respective computing system for sale), a serial number of the computing system, a system or commodity tracking number (for identifying a system board of the computing system), a system configuration identifier (for identifying a configuration of the computing system), warranty data (for describing a warranty associated with the computing system), a universally unique identifier (UUID), a default setting of BIOS code, and so forth. The foregoing is provided as examples of machine unique data; in other examples, other or additional types of machine unique data can be provided.

The shared non-volatile memory 104 also stores machine unique data 436 that is the same as or similar to the machine unique data 430.

Figure 5:
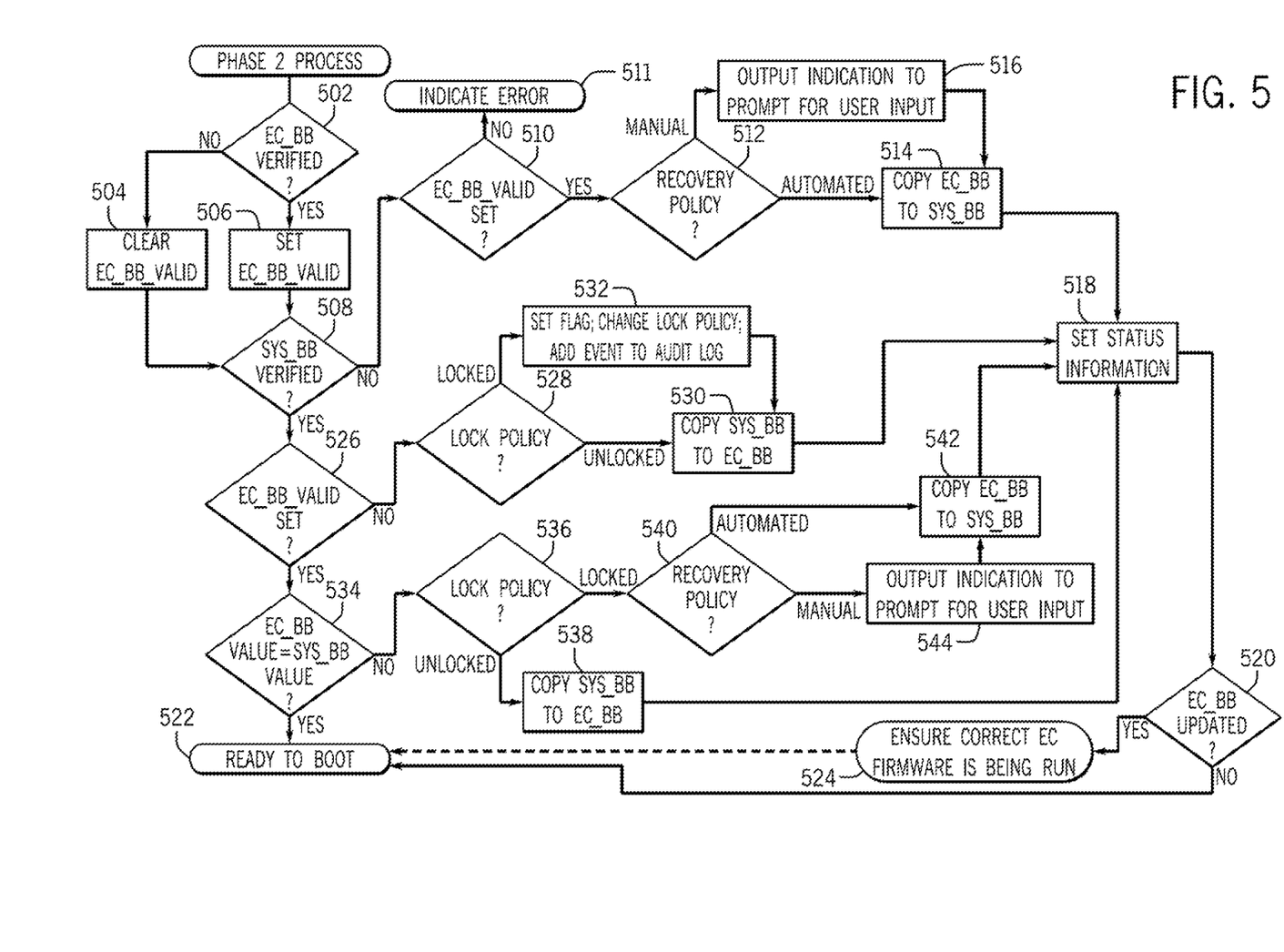
FIGS. 5-7 are flow diagrams of processes according to further implementations.

FIG. 5 is a flow diagram of a Phase 2 process, which is performed after successful completion of the Phase 1 process depicted in FIG. 2. The Phase 2 process of FIG. 5 can be performed by the embedded controller 102, under control of the EC firmware executed in the Phase 1 process (in task 208 or 216 in FIG. 2).

As shown in FIG. 5, the embedded controller determines (at 502) whether the boot block 130 (represented as ECBB in FIG. 5) in the private non-volatile memory 116 is verified (based on a verification performed using the signature 442 of FIG. 4). If not, then an EC_BB_Valid flag is cleared (at 504) to a cleared state, to indicate that the boot block 130 in the private non-volatile memory 116 is not verified.

However, if the determination at 502 indicates that the boot block 132 has been verified, then the EC_BB_Valid flag is set (at 506) to a set state, to indicate that the boot block 132 in the private non-volatile memory 116 has been verified.

Next, the EC firmware determines (at 508) whether the boot block 110 (represented as SYS_BB in FIG. 5) in the shared non-volatile memory 104 has been verified (based on a verification performed using the signature 424 of FIG. 4). If not, the EC firmware next checks (at 510) whether the EC_BB_Valid flag is set (at 510). If not, that is an indication that both the boot blocks 132 and 110 in the private and shared non-volatile memories 116 and 104 cannot be verified, and an error is indicated (at 511). At this point, the Phase 2 process of FIG. 5 stops, since the system cannot be allowed to boot due to compromised boot blocks.

If it is determined (at 510) that the EC_BB_Valid flag is set, then that is an indication that the boot block 132 in the private non-volatile memory 116 has been verified, even though the boot block 110 in the shared non-volatile memory 104 cannot be verified. In this case, the EC firmware determines (at 512) whether the recovery policy (stored as part of the policy information 434 in the private non-volatile memory 116 of FIG. 4) specifies a manual mode or an automated mode. If the automated mode is indicated, then the valid boot block 132 in the private non-volatile memory 116 is copied (at 514) to replace the invalid boot block 110 in the shared non-volatile memory 104.

However, if the recovery policy specifies the manual mode, then an indication can be output (at 516) to prompt for user input, such as a key sequence or other input. Receipt of the user input causes the task 514 to be performed, where the invalid boot block 110 in the shared non-volatile memory 104 is replaced with a copy of the valid boot block 132 in the private non-volatile memory 116.

Next, the EC firmware sets (at 518) various status information to report actions that were taken, where the status information can be used in the next boot of the computing system.

The EC firmware next determines (at 520) whether the boot block 132 in the private non-volatile memory 116 has been updated. If not, then the computing system is ready to boot (522). However, if the boot block 132 in the private non-volatile memory 116 has been updated, then the EC firmware performs (at 524) an action to cause the computing system to check that the embedded controller 102 is running the correct version of the EC firmware, which can be accomplished by resetting the embedded controller 102, which causes the Phase 1 process of FIG. 2 to be performed, which would then proceed again to the Phase 2 process of FIG. 5 if the Phase 1 process successfully verified the EC firmware.

In task 508 of FIG. 5, if the EC firmware is able to verify the boot block 110 in the shared non-volatile memory 104, then the EC firmware checks (at 526) whether the EC_BB_Valid flag is set. If not, that is an indication that the boot block 110 in the shared non-volatile memory 110 is valid, but the boot block 132 in the private non-volatile memory 116 is invalid. In this scenario, the EC firmware determines (at 528) whether the lock policy (as indicated in the policy information 434 of FIG. 4) specifies a locked mode or unlocked mode. If the unlocked mode is specified, that means that the boot block 132 in the private non-volatile memory 116 can be updated, in which case the EC firmware copies (at 530) the boot block 110 in the shared non-volatile memory 104 to the private non-volatile memory 116 to replace the boot block 132.

On the other hand, if it is determined (at 528) that the lock policy specifies the locked mode, then that indicates that the EC firmware is not allowed to update the boot block 132 in the private non-volatile memory 116. In this case, the EC firmware can set a flag (at 532) to indicate a change in the lock policy, which involves the lock policy being changed to specify the unlocked mode. Changing the lock policy from the locked mode to the unlocked mode allows the boot block 132 in the private non-volatile memory 116 to be replaced with the boot block 110 in the shared non-volatile memory 104 (as performed at 532). In addition, information can be added to an audit log (not shown) to indicate the foregoing event (lock policy being changed).

The process then next proceeds to task 518.

In task 526, if it is determined that the EC_BB_Valid flag is set, that indicates that both the boot block 132 and boot block 110 have been verified. In this scenario, the EC firmware determines (at 534) whether a value (e.g. hash value, checksum value, etc.) derived based on the content of the boot block 132 is equal to a value derived based on the content of the boot block 110. If so, it is confirmed that the two boot blocks 132 and 110 are identical, and thus, the system is ready to boot (522). On the other hand, if the values derived based on the contents of the boot blocks 132 and 110 are not equal (which indicates that the boot blocks 132 and 110 are different versions), then the EC firmware determines (at 536) whether the BIOS lock policy specifies a locked mode or an unlocked mode, if the unlocked mode is specified, then the EC firmware can copy (at 538) the boot block 110 in the shared non-volatile memory 104 to the private non-volatile memory 116 to replace the boot block 132. The process then proceeds to task 518.

If the lock policy determined at 536 specifies the locked mode, then that is an indication that the boot block 110 in the shared non-volatile memory 104 is to be locked to the version of the boot block 132 stored in the private non-volatile memory 116. In some cases, the boot block 110 in the shared non-volatile memory 104 may have been updated to a newer version. However, if the lock policy specifies the locked mode, then this update of the boot block 110 in the shared non-volatile memory 104 is not allowed, in which case the boot block 110 in the shared non-volatile memory 104 is replaced with the boot block 132 in the private non-volatile memory 116 (by performing the copying at 542). Prior to copying (at 542) the boot block 132 to replace the boot block 110, the EC firmware can check (at 540) whether the recovery policy specifies an automated mode or a manual mode. If the automated mode is specified, then the copying at 542 can be performed directly. However, if the manual mode is specified, then the EC firmware can provide (at 544) an output to prompt for user input, after which the copying at 542 can be performed.

The process then proceeds to task 518.

Figure 6:
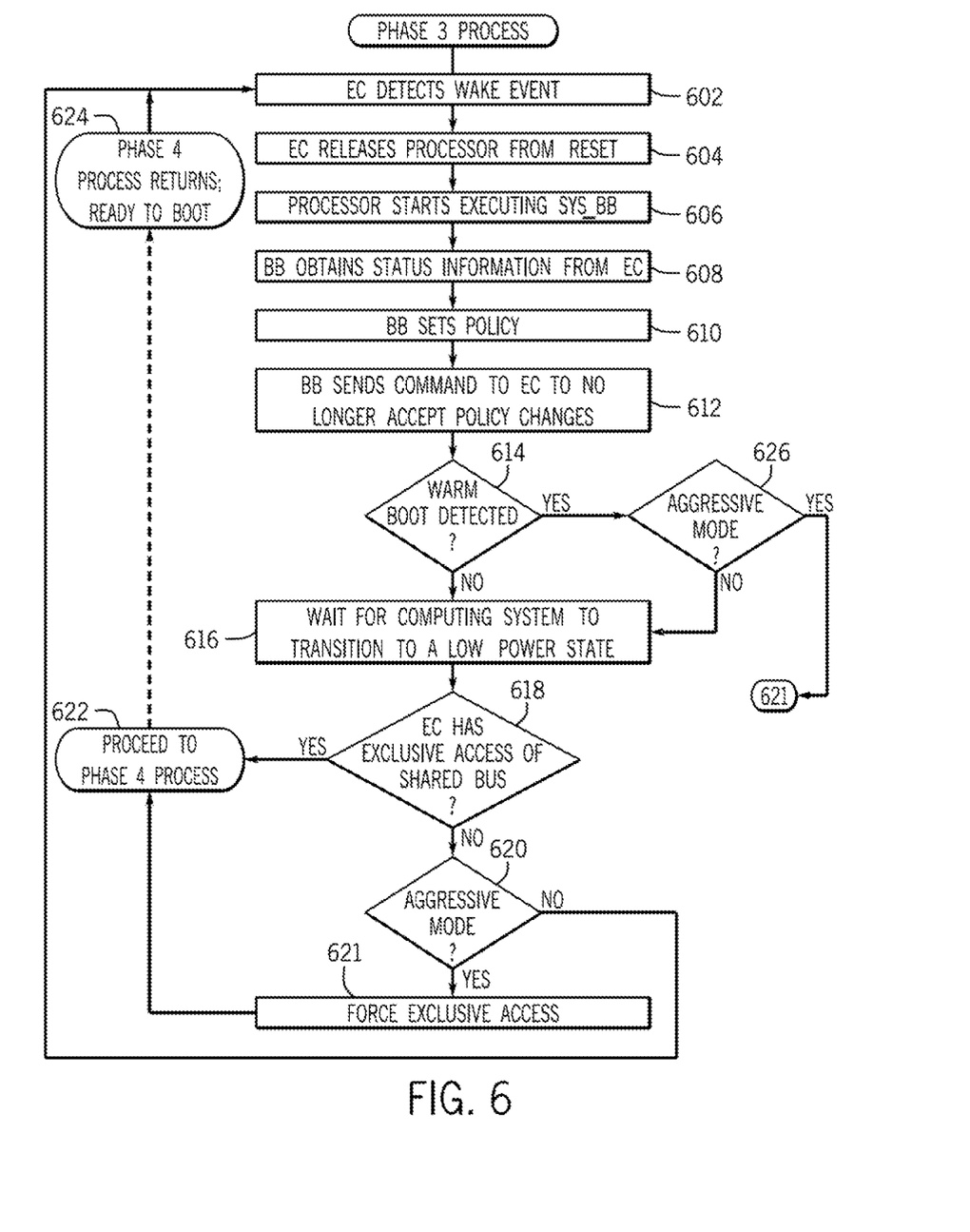

FIG. 6 shows a Phase 3 process, after successful completion of the Phase 2 process in FIG. 5 (the Phase 2 process has proceeded to 522). The Phase 3 process can be performed by the embedded controller 102 and the processor 106.

The embedded controller 102 detects (at 602) a wake event in the computing system, where the wake event causes the computing system to transition from a low power state to a higher power state. The wake event can be caused by actuation of a user input device such as a keyboard or mouse of the computing system, actuation of a power button, and so forth.

The embedded controller 102 releases (at 604) the processor 106 from reset. The processor 106 then starts executing (at 606) the boot block 110 (represented as SYS_BB in FIG. 6) from the shared non-volatile memory 104. Under control of the boot block 110, the processor 106 obtains (at 608) status information from the embedded controller 102. This status information is the status information set by the embedded controller in task 518 in FIG. 5.

In some examples, the boot block 110 can set (at 610) the embedded controller policy, which can be any of the lock policy, recovery policy, recovery policy, or any other policy related to performance of the EC firmware discussed above. Setting the embedded controller policy can involve sending an instruction to the embedded controller 102 to cause the embedded controller 102 to update the policy information 434 in the private non-volatile memory 116 (FIG. 4).

The boot block 110 then sends (at 612) a command to the embedded controller 102 to cause the embedded controller 102 to no longer accept any policy changes, prior to the boot block passing control to the main portion of the BIOS code. The effect of the command is to prevent policy changes from code that may be subject to compromise and thus may not be trusted, such as the main portion of the BIOS code or the operating system.

The embedded controller 102 next determines (at 614) whether a warm boot has occurred. If not, the embedded controller 102 waits (at 616) for the computing system to transition to a low power state, such as the ACPI S3, S4, or S5 states.

After the computing system has transitioned to a low power state, the embedded controller 102 next determines (at 618) whether the embedded controller has exclusive access of the shared bus 120. If so, then the process proceeds (at 622) to a Phase 4 process (FIG. 7) to cause verification of the boot blocks 132 and 110. A successful return from the Phase 4 process indicates that the computing system is ready to boot (624) and proceed to a runtime state (e.g. ACPI S0 state).

If it is determined (at 618) that the embedded controller 102 does not have exclusive access on the shared bus 120, even though the computing system has transitioned to the low power state, then the embedded controller 102 can determine (at 620) from the policy information (434 in FIG. 4) whether aggressive mode is specified.

If aggressive mode is specified, then the embedded controller 102 can perform an action to force (at 621) exclusive access of the shared bus 120. This action can include forcing core logic of the computing system (e.g. chipset including the I/O controller 402 of FIG. 4) into a state that allows the embedded controller 102 to gain exclusive access of the shared bus 120. In some examples, this can occur only in the S4 or S5 states, and not in the S3 state, to avoid the loss of the S3 context (the information in the volatile memory that is used for resuming the computing system from the S3 state). If the computing system is in the S3 state or the aggressive mode policy is not set, then the Phase 4 process 622 would be bypassed, which bypasses the verification of the boot blocks.

In task 614 of FIG. 6, if the embedded controller 102 detects a warm boot (boot of the computing system in which power to the components, including the processor 106, of the computing system is maintained), then the embedded controller 102 determines (at 626) whether an aggressive mode is specified by policy. If not, then the embedded controller 102 proceeds to wait (at 616) for the computing system to enter a low power state.

However, if aggressive mode is specified, then the embedded controller 102 proceeds to task 621. It is desirable for the embedded controller 102 to verify the boot block authenticity on each warm reset since warm reset causes the processor 106 to start execution from the beginning of the boot block.

In some implementations, the checking (at 618) to ensure that the embedded controller 102 has exclusive access of the shared bus 120 even though the computing system is in a low power state (e.g. ACPI S3, S4, or S5 state) is performed due to the possibility that an entity (such as an entity in the I/O controller 402 of FIG. 4 or another entity) still remains enabled and has access to the shared bus 120 in the low power state.

An example entity that can remain enabled and have access to the shared bus 120 in a low power state is a Management Engine (ME) that is part of a chipset from Intel Corporation. The ME provides functionality to allow for monitoring, maintenance, updating, upgrading, and repairing of a computing system. The ME can be provisioned to operate in a low power state (e.g. S3, S4, or S5 state). In accordance with some implementations, the embedded controller 102 will verify the boot blocks 132 and 110 only if the embedded controller 102 receives an indication (e.g. an SLP_A # signal from the ME being in an asserted state) from the ME that the ME is in a state that power can be removed from the ME. If the embedded controller 102 does not receive the indication (e.g. the SLP_A # signal from the ME being in the asserted state), then the embedded controller 102 assumes that the shared bus 120 is in use by the ME and the embedded controller 102 does not attempt to access the shared bus 102.

If aggressive mode is specified (as determined at 620 in FIG. 6) when the computing system is in the S4 or S5 state, the embedded controller 102 can force (at 621) the exclusive access of the shared bus 120 by asserting a reset signal (e.g. RSMRST # to the I/O controller 402) to force the ME into an off state. This technique of forcing exclusive access of the shared bus 120 is not used when the system is in the S3 state since it would cause a loss of the S3 context.

In some cases, it is also possible for the ME to resume from an off state while the embedded controller 102 is accessing the shared bus 120 when the system is in a low power state (to perform the Phase 1 process of FIG. 2, for example). To prevent such resumption of ME while the embedded controller 102 is accessing the shared bus 120, logic can be provided to prevent the ME from resuming by either blocking a power-good indication (e.g. M_PWRGO) from being provided to the ME, by asserting a BATLOW # signal to the I/O controller 402. The power-good indication is an indication that the ME power source is active, while the BATLOW # signal is an indication that the platform main battery (e.g. 410 in FIG. 4) may not be able to supply enough power for proper operation. The embedded controller 102 can control this logic to block the power-good indication while the embedded controller 102 is accessing the shared, bus 120. Once the embedded controller 102 has completed its operations that involve access of the shared bus 120, the embedded controller 120 can stop blocking of the power-good indication to the ME and/or stop asserting the BATLOW # signal.

Figure 7:
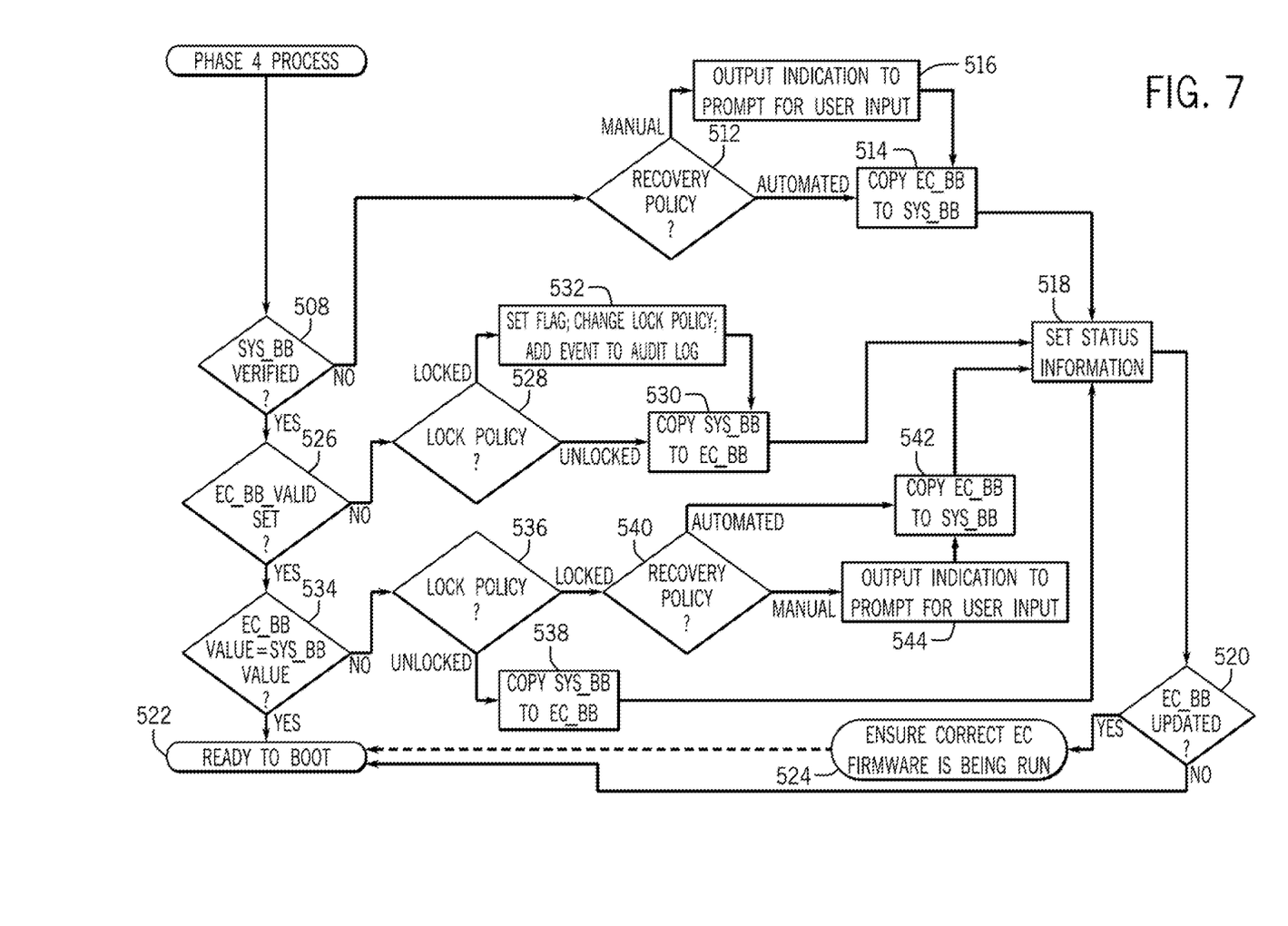

FIG. 7 is a flow diagram of the Phase 4 process according to some implementations. Note that, the Phase 4 process (initiated at 622 in FIG. 6) assumes that the EC_BB_Valid flag is set (which means that the boot block 132 in the private non-volatile memory 116 has been verified and thus valid). The Phase 4 process proceeds to task 508, which is the same as task 508 in FIG. 5 discussed above. The remaining tasks depicted in FIG. 7 are identical to respective tasks in FIG. 5, and thus will not be discussed further. Note that in FIG. 7, tasks 502, 504, 506, 510, and 511 are omitted, since it is assumed that the EC_BB_Valid flag is set.

By using techniques or mechanisms according to some implementations, integrity of system firmware is checked to protect against system firmware compromise caused by malware attack, which may be able to breach a protection mechanism of a computing system. In addition, protection can be afforded against an attack that involves physical replacement of a part that includes a non-volatile memory containing the system firmware. The protection against compromise of the system firmware does not have to rely on protection mechanisms in the core logic or IO controller from third party vendors, which may vary from vendor to vendor and which may be compromised. System firmware can be recovered in case of the system firmware is compromised, without having to involve service personnel. Detection of and recovery of compromised system firmware can be afforded regardless of the origin of the compromise, the time of the compromise, how the compromise is performed, and what type of compromise is performed.

Machine-readable instructions of various modules described above are loaded for execution on a processing circuit (e.g. embedded controller 102 or processor 106). A processing circuit can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What claimed is:

1. A method comprising:
   during an initialization procedure of a controller in a system, verifying, by the controller that is separate from a processor of the system, controller code for execution on the controller, wherein the verifying is performed before execution of the processor;
   after verifying the controller code, verifying, by the controller, system boot code, wherein the system boot code is for execution by the processor; and
   the controller code upon execution by the controller verifying the system boot code prior to each instance of the processor restarting execution of the system boot code.

2. The method of claim 1, wherein the controller code upon execution in the controller causes the controller to perform at least one selected from among: power supply control in the system, thermal monitoring in the system, fan control in the system, battery charging and control in the system, and interaction with a user input device.

3. The method of claim 1, wherein the system boot code includes core root of trust for measurement (CRTM) logic executable on the processor to make measurements in the system that are used by the system to determine trustworthiness of the system.

4. The method of claim 1, wherein verifying the controller code comprises verifying embedded controller firmware that is part of basic input/output system (BIOS) code stored in a memory.

5. The method of claim 1, wherein the controller code is retrieved from a private memory to determine whether the controller code is compromised, and wherein the private memory is accessible by the controller and inaccessible by the processor, the method further comprising:
   in response to detecting compromise of the controller code in the private memory, retrieving, by the controller, controller code from a shared memory that is also accessible by the processor, and verifying the controller code retrieved from the shared memory; and
   in response to verifying the controller code retrieved from the shared memory, executing the controller code retrieved from the shared memory in the controller to perform the verifying of the system boot code in one or both of the private memory and the shared memory.

6. The method of claim 5, further comprising:
   in response to determining that either the system boot code in the private memory or the system boot code in the shared memory is compromised, updating the compromised system boot code in the private memory or the shared memory with a non-compromised system boot code from the private memory or the shared memory.

7. The method of claim 5, further comprising:
   determining, by the controller, whether the system boot code in the shared memory is a different version from the system boot code in the private memory;
   in response to determining that the system boot code in the shared memory is of a different version from the system boot code in the private memory, determining whether a lock policy is set specifying that system boot code is to be locked to a version of the system boot code in the private memory; and
   in response to determining that the lock policy is set, updating the system boot code in the shared memory to the version of the system boot code in the private memory.

8. The method of claim 1, wherein the controller has read-only memory storing a cryptographic key, and wherein the verifying of the controller code uses the cryptographic key.

9. The method of claim 1, wherein the controller is an embedded controller, and the controller code comprises embedded controller firmware.

10. A system comprising:
    a processor;
    a first memory storing controller firmware and a boot block of Basic Input/Output System (BIOS) code;
    a second memory storing controller firmware and a boot block of BIOS code; and an embedded controller to:
  during initialization of the embedded controller while the processor is off, determine whether the controller firmware stored in the first memory is compromised, wherein the controller firmware is for execution in the embedded controller, and wherein the first memory is accessible by the embedded controller but inaccessible to the processor; and
  in response to detecting compromise of the controller firmware in the first memory, retrieve the controller firmware stored in the second memory, and execute instructions of the retrieved controller firmware by the embedded controller.

11. The system of claim 10, wherein the embedded controller is to execute the controller firmware of the second memory to verify the boot blocks in the first memory and the second memory.

12. The system of claim 11, wherein the embedded controller is to replace a compromised one of the boot blocks with a non-compromised one of the boot blocks.

13. The system of claim 11, wherein the verifying of the boot blocks is performed in response to the system transitioning to a state after which the processor will subsequently restart execution from the boot block in the second memory.

14. The system of claim 11, wherein the processor is to execute the boot block in the second memory in response to the verifying of the boot block in the second memory by the embedded controller.

15. The system of claim 10, wherein the first memory stores policy information indicating at least one or a combination of the following policies:
  a policy specifying whether an aggressive mode of operation is to be used to enable verification of the boot block in the second memory before each instance of the processor restarting execution from the boot block in the second memory;
  a policy specifying whether a manual or automated recovery mode is to be used, where a manual recovery mode involves a user action before recovery of a compromised boot block is allowed to be performed; and
  a policy specifying whether a locked or unlocked mode is to be used, where locked mode causes system firmware to be locked to a specific version.

16. The system of claim 10, wherein the second memory is accessible by both the embedded controller and the processor.

17. The system of claim 10, wherein the embedded controller is to execute the controller firmware of the first memory or the second memory to perform at least one selected from among: power supply control in the system, thermal monitoring in the system, fan control in the system, and battery charging in the system.

18. An article comprising at least one non-transitory machine-readable storage medium storing instructions that upon execution cause a system to:
  before a processor of the system starts executing a boot block, verify, by an embedded controller, a controller code stored in a first memory, wherein the controller code is for execution in the embedded controller, and wherein the first memory is accessible by the embedded controller but inaccessible to the processor of the system; and
  in response to detecting compromise of the controller code in the first memory, retrieve controller code stored in a second memory that is accessible by both the embedded controller and the processor, wherein the controller code stored in the second memory is for execution in the embedded controller; and
  execute, by the embedded controller, the controller code of the first memory or the second memory to perform verification of the boot block in one or both of the first and second memories.

19. The article of claim 18, wherein the instructions upon execution cause the system to:
  in response to the verification of the boot block in the second memory, execute the boot block in the second memory by the processor.

* * * * *